(12) United States Patent
Huomo

(10) Patent No.: US 8,655,273 B2
(45) Date of Patent: Feb. 18, 2014

(54) NFC COMMUNICATOR AND METHOD OF DATA COMMUNICATION

(75) Inventor: Heikki Huomo, Meysey Hampton (GB)

(73) Assignee: Broadcom Innovision Limited, Cambridge, Cambridgeshire (GB)

( * ) Notice: Subject to any disclaimer, the term of this patent is extended or adjusted under 35 U.S.C. 154(b) by 670 days.

(21) Appl. No.: 12/518,440

(22) PCT Filed: Dec. 7, 2007

(86) PCT No.: PCT/GB2007/004694
§ 371 (c)(1),
(2), (4) Date: Jun. 10, 2009

(87) PCT Pub. No.: WO2008/071925
PCT Pub. Date: Jun. 19, 2008

(65) Prior Publication Data
US 2010/0009627 A1   Jan. 14, 2010

(30) Foreign Application Priority Data

Dec. 15, 2006  (GB) .................................. 0625093.0
Jan. 12, 2007   (GB) .................................. 0700671.1
May 15, 2007   (GB) .................................. 0709324.8
Jun. 18, 2007   (GB) .................................. 0711783.1

(51) Int. Cl.
*H04B 5/00* (2006.01)
*H04B 7/00* (2006.01)
*H04B 1/00* (2006.01)

(52) U.S. Cl.
USPC ............................ 455/41.1; 455/41.3; 455/69

(58) Field of Classification Search
USPC ............... 455/39, 41.1, 41.2, 41.3, 68, 69, 70
See application file for complete search history.

(56) References Cited

U.S. PATENT DOCUMENTS 6,807,575 B1   10/2004   Emaru et al.
7,836,062 B2 *  11/2010   Emaru et al. .................. 707/752
(Continued)

FOREIGN PATENT DOCUMENTS

CA       2294721 C    12/1998
EP       0969426 B1    5/2002
(Continued)

OTHER PUBLICATIONS

ISO/IC FCD 14443-2, xx, xx, No. 14443-2, Mar. 26, 1999, pp. 1015, XP002250776 pp. IV, 9, 15; Identification cards—Contactless integrated circuit(s) cards—Proximity cards—Part 2: Radio frequency power and signal interface.

(Continued)

*Primary Examiner* — Andrew Wendell
(74) *Attorney, Agent, or Firm* — Sterne, Kessler, Goldstein & Fox P.L.L.C.

(57) ABSTRACT

An NFC communicator has a coupler operable to couple with a coupler of a near field RF communicator in near field range to enable communication of data between the communicators by modulation of a magnetic field, a demodulator to extract modulation from a modulated signal coupled to the coupler, and a modulator to modulate an RF signal in accordance with data to be communicated by the NFC communicator. The NFC communicator communicates with a data source and is arranged to at least one of provide timing data to the data source and receive timing data from the data source.

17 Claims, 9 Drawing Sheets

(56) References Cited

U.S. PATENT DOCUMENTS

| | | | |
|---|---|---|---|
| 2004/0203383 A1* | 10/2004 | Kelton et al. | 455/41.2 |
| 2004/0215964 A1 | 10/2004 | Barlow et al. | |
| 2005/0049040 A1* | 3/2005 | Roberts | 463/25 |
| 2006/0124755 A1 | 6/2006 | Ito | |
| 2006/0294182 A1* | 12/2006 | Enomoto et al. | 709/203 |
| 2007/0288480 A1* | 12/2007 | Caplan et al. | 707/10 |

FOREIGN PATENT DOCUMENTS

| | | |
|---|---|---|
| EP | 1450297 A1 | 8/2004 |
| EP | 1701559 A2 | 9/2006 |
| EP | 1798867 A2 | 6/2007 |
| EP | 1814239 A2 | 8/2007 |
| GB | 2365699 A | 2/2002 |
| GB | 2422517 A | 7/2006 |
| GB | 2427330 A | 12/2006 |
| GB | 2433386 A | 6/2007 |
| GB | 2444799 B | 2/2008 |
| GB | 2444798 A | 6/2008 |
| WO | WO2005/057481 A1 | 6/2005 |
| WO | WO2005/069236 A1 | 7/2005 |
| WO | WO2005/098769 A1 | 10/2005 |
| WO | WO2006/044590 A1 | 4/2006 |
| WO | 2006095186 A1 | 9/2006 |
| WO | WO2007/045732 A1 | 4/2007 |
| WO | WO2008/071924 A3 | 6/2008 |
| WO | WO2008/071925 A1 | 6/2008 |

OTHER PUBLICATIONS

International Searching Authority— European Patent Office, International Search Report and Written Opinion for PCT/GB2007/004694, Apr. 29, 2008, 13 pages.

United Kingdom Patent Office; Patents Act 1977: Search Report Under Section 17 for Application No. GB0711783.1, Jul. 25, 2007, 3 pages.

United Kingdom Patent Office; Patents Act 1977: Examination Report Under Section 18(3) for Application No. GB0711783.1, Oct. 20, 2008, 2 pages.

ECMA International, Standard ECMA-340, Near Field Communication Interface and Protocol (NFCIP-1), Dec. 2004, 2nd ed., ECMA, Geneva, Switzerland.

ECMA International, Standard ECMA-373, Near Field Communication Wired Interface (NFC-WI), Jun. 2006, 1st ed., ECMA, Geneva, Switzerland.

European Search Report dated Dec. 4, 2012, issued in related European Application No. 12005410.1.

* cited by examiner

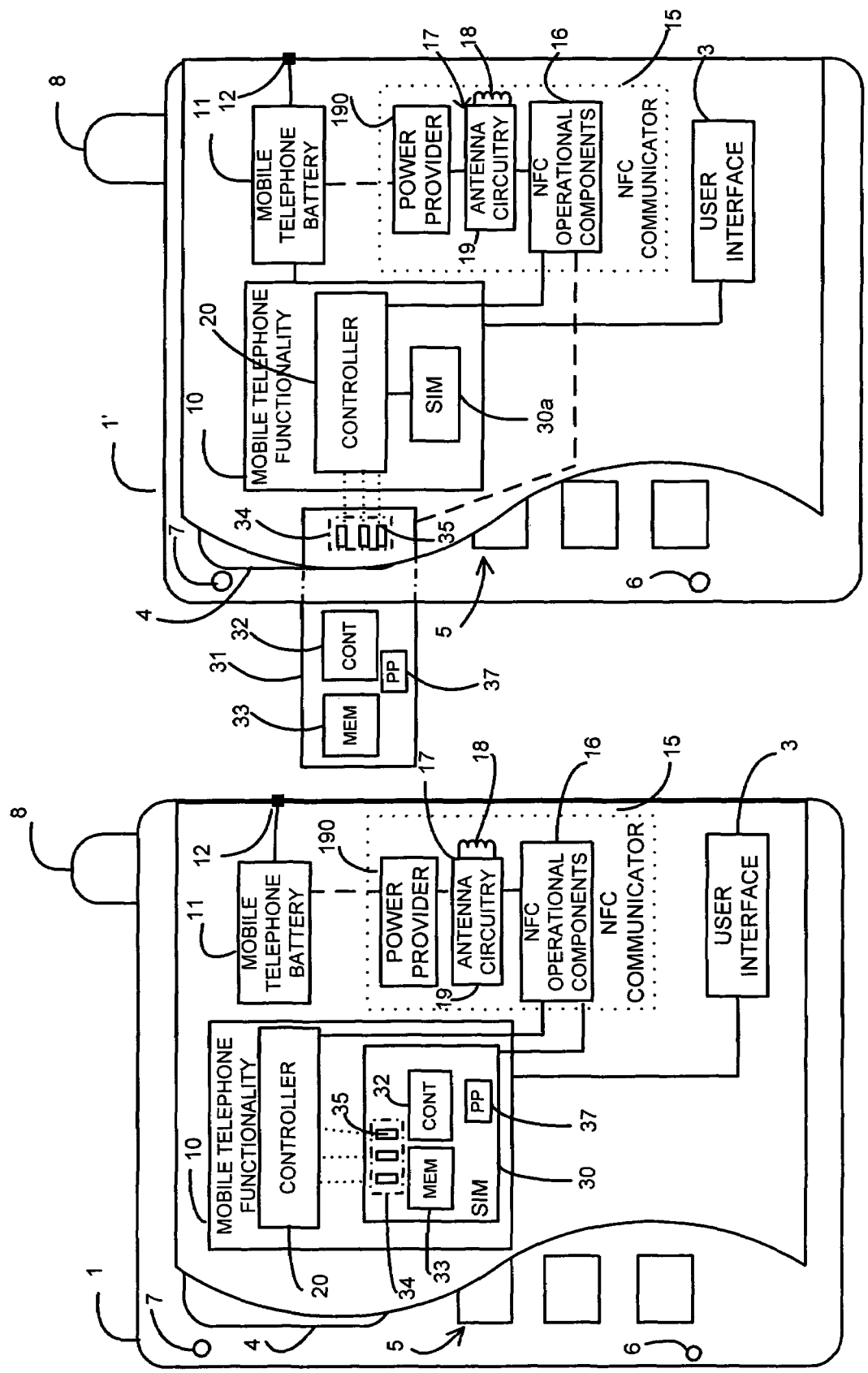

| Command | | Operation (7 bits) | | | | | | | Comment |
|---|---|---|---|---|---|---|---|---|---|
| | | MSB | | | | | | LSB | (all commands are independent) |
| | | b7 | b6 | b5 | b4 | b3 | b2 | b1 | |
| REQA | 26 | 0 | 1 | 0 | 0 | 1 | 1 | 0 | Request command, type A |
| WUPA | 52 | 1 | 0 | 1 | 0 | 0 | 1 | 0 | Wake-up, type A |
| RID | 78 | 1 | 1 | 1 | 1 | 0 | 0 | 0 | Read-ID – Use to read metal-mask ROM and UID0-3 from block0 |
| RALL | 00 | 0 | 0 | 0 | 0 | 0 | 0 | 0 | Read All (all bytes) |
| READ | 01 | 0 | 0 | 0 | 0 | 0 | 0 | 1 | Read (a single byte) |
| WRITE-E | 53 | 1 | 0 | 1 | 0 | 0 | 1 | 1 | Write-with-erase (a single byte) |
| WRITE-NE | 1A | 0 | 0 | 1 | 1 | 0 | 1 | 0 | Write-no-erase (a single byte) |

FIG. 5

Command-response summary table

| Command | Command (Multiple frames to the device) | | | | | | | | | Response (Single frame from the device) | | | | | |
|---|---|---|---|---|---|---|---|---|---|---|---|---|---|---|---|
| REQA | REQA | | | | | | | | | ATQA0 | ATQA1 | | | | |
| WUPA | WUPA | | | | | | | | | ATQA0 | ATQA1 | | | | |
| RID | RID | ADD | DAT | UID0 | UID1 | UID2 | UID3 | CRC1 | CRC2 | HR0 | HR1 | UID0 | UID3 | CRC1 | CRC2 |
| RALL | RALL | ADD | DAT | UID0 | UID1 | UID2 | UID3 | CRC1 | CRC2 | HR0 | HR1 | UID0 | DATe | CRC1 | CRC2 |
| READ | READ | ADD | DAT | UID0 | UID1 | UID2 | UID3 | CRC1 | CRC2 | ADD | DAT | CRC1 | CRC2 | | |
| WRITE-E | WRITE-E | ADD | DAT | UID0 | UID1 | UID2 | UID3 | CRC1 | CRC2 | ADD | DAT | CRC1 | CRC2 | | |
| WRITE-NE | WRITE-NE | ADD | DAT | UID0 | UID1 | UID2 | UID3 | CRC1 | CRC2 | ADD | DAT | CRC1 | CRC2 | | |

FIG. 6

NFC COMMUNICATOR AND METHOD OF DATA COMMUNICATION

CROSS-REFERENCE TO RELATED APPLICATIONS

This application is a national stage application under 35 U.S.C. §371 of International Application No. PCT/GB2007/004694, filed Dec. 7, 2007; which claims priority to United Kingdom Application No. 0625093.0, filed Dec. 15, 2006; United Kingdom Application No. 0700671.1, filed Jan. 12, 2007; United Kingdom Application No. 0709324.8, filed May 15, 2007; and United Kingdom Application No. 0711783.1, filed Jun. 18, 2007; the contents of which are herein incorporated by reference.

FIELD OF THE INVENTION

This invention relates to NFC communicators or larger devices or systems comprising NFC communicators.

BACKGROUND TO THE INVENTION

Near field RF (radio frequency) communication requires an antenna of one near field RF communicator to be present within the alternating magnetic field (H field) generated by the antenna of another near field RF communicator by transmission of an RF signal (for example a 13.56 Mega Hertz signal) to enable the magnetic field (the H field) of the RF signal to be inductively coupled between the communicators. The RF signal may be modulated to enable communication of control and/or other data.

Near field communication in the context of this application may be referred to as near-field RF communication, near field RFID (Radio Frequency Identification) or near field communication. The range of such devices depends on the antenna used but may be, for example, up to 1 meter. A near field RF communicator may be, as examples: an initiator near field RF communicator (such as a near field RFID transceiver or RFID reader) that is capable of initiating a near field RF communication (through transmission or generation of an alternating magnetic field) with another near field RF communicator; a target near field RF communicator (such as an RF transponder or tag) that is capable of responding to initiation of a near field RF communication by another near field RF communicator; or an NFC communicator that is capable of being both an initiator and target and that in an initiator mode is capable of initiating a near field RF communication (through transmission or generation of an alternating magnetic field) with another near field RF communicator and in a target mode is capable of responding to initiation of a near field RF communication by another near field RF communicator.

Communication of data between NFC communicators may be via an active communication mode in which the NFC communicator transmits or generates an alternating magnetic field modulated with the data to be communicated and the receiving NFC communicator responds by transmitting or generating its own modulated magnetic field, or via a passive communication mode in which one NFC communicator transmits or generates an alternating magnetic field and maintains that field and the responding NFC communicator modulates the magnetic field to which it is inductively coupled with the data to be communicated, for example by modulating the load on the inductive coupling ("load modulation"). Near field RF communicators may be actively powered, that is have an internal or associated power source, or passively powered, that is derive a power supply from a received magnetic field. Generally an RF transceiver will be active powered while an RF transponder may be passively or actively powered.

There are several standards in existence which set out certain communication protocols and functional requirements for near field communication. For example ISO/IEC 14443 sets out certain criteria for proximity card and reader/writer systems, ISO 15693 sets out certain criteria for vicinity card and reader/writer systems. Examples of NFC communicators include those described in standards ISO/IEC 18092 and ISO/IEC 21481. NFC communicators may also be referred to as CLFs within standards.

All of these standards require communication to be in accordance with certain timing protocols. For example under the NFC standards ISO/IEC 18092 and ISO/IEC 21481, a responding NFC communicator must supply data in answer to a request within 87 micro seconds (plus or minus 6.5 micro seconds). An NFC communicator may reside within a variety of end systems and host devices, for example mobile telephones, lap-tops, PDAs. The NFC communicators in such end systems and host devices may be used to transfer data from a variety of sources within those end systems and host devices.

SUMMARY OF THE INVENTION

In one aspect, the present invention provides an NFC communicator that enables communication between the NFC communicator and a data source external to the NFC communicator without affecting the ability of the NFC communicator to respond in accordance with the timing protocols under which the NFC communicator is required to operate.

In one aspect, the present invention provides an NFC device comprising such a communicator, that achieves compliance with existing timing standards whilst being cost effective and flexible to implement.

In one aspect, the present invention provides a data source (for example a secure element or host system) that achieves compatibility with essential standards requirements and protocols whilst being cost effective and flexible to implement.

In one aspect, the present invention provides an NFC communicator comprising:

a coupler operable to couple with a coupler of a near field RF communicator in near field range to enable communication of data between the communicators by modulation of a magnetic field;

a demodulator to extract modulation from a modulated signal coupled to the coupler; and a modulator to modulate an RF signal in accordance with data to be communicated by the NFC communicator, the NFC communicator being operable to communicate with a data source and to at least one of provide timing data to the data source and receive timing data from the data source.

In one aspect, the present invention provides a data source operable to couple to an NFC communicator wherein the data source comprises a data store and a controller to provide timing information to the NFC communicator based on the time taken by the data source to respond to a request from the NFC communicator for data from the data store.

In one aspect, the present invention provides a data source operable to couple to an NFC communicator wherein the data source comprises a data store and a controller and the controller is operable to receive timing data from the NFC communicator and to calculate a time required for response to a request from the NFC communicator in accordance with the received timing data.

In one aspect, the present invention provides an NFC communications enabled device, the device comprising:

an NFC communicator having a coupler operable to couple with a coupler of a near field RF communicator in near field range to enable communication of data between the communicators by modulation of a magnetic field, a demodulator to extract modulation from a modulated signal coupled to the coupler and a modulator to modulate an RF signal in accordance with data to be communicated by the NFC communicator; and at least one data source coupled to the NFC communicator, at least one of the at least one data source and the NFC communicator being operable to transfer timing data to the other of the NFC communicator and the at least one data source.

In one aspect, the present invention provides a method of near field communication which comprises communicating communication timing data between an NFC communicator and at least one data source.

In one aspect, the present invention provides a method of near field communication which comprises communicating between an NFC communicator and at least one data source data to enable the NFC communicator to determine whether or not data from the data source can be retrieved and supplied to a requesting near field RF communicator within a required period.

In one aspect, the present invention provides a method of near field communication which comprises communicating between an NFC communicator and at least one data source data to enable the data source to determine a time period in which it should respond to a request for data from the NFC communicator to enable NFC communicator to supply the data to a requesting near field RF communicator within a required period.

The data source may be a secure element.

In an embodiment of the present invention there is provided an NFC communicator operable to transfer data from its memory or data store to a data source (for example a secure element) wherein such data comprises data as to the time taken to receive and process incoming NFC data and the time taken to process and transmit outgoing NFC data and where incoming NFC data and outgoing NFC data refers to data communicated with an external RFID communicator.

In an embodiment, the NFC communicator:

Is operable to communicate with another near field RF communicator through modulation of a proximal H field;

Is operable both to initiate communication using the H field and to respond to initiation of communication using the H field by an initiator near field RF communicator such as an external RFID communicator.

Is controlled in accordance with instructions received from a controller (for example a microprocessor, microcontroller or reduced instruction set computer), where that controller may be integral to the NFC communicator or comprised within a larger host device or system;

has a modulator to modulate a proximal H field generated by, for example, an initiator near field RF communicator to provide outgoing NFC data to another near field RF communicator;

has a demodulator to demodulate a modulated RF signal received from another near field communicator to extract NFC data.

The extracted NFC data may comprise, for example, instructions and identification data from the other near field RF communicator in accordance with the appropriate applicable standards, for example ISO 18092 or ISO 21481. The outgoing NFC data may comprise, for example, data from a data source such as a secure element or other data source within the NFC communications enabled device or data from a memory or data store within the NFC communicator itself.

In an embodiment, the timing data comprises an indication relating to a time period for response to a request from a near field RF communicator requiring data from the data source. The indication may be estimate of the time period.

The NFC communicator may form part of a larger device or host. In such a case, the NFC communicator may be removable from or fixed within the larger device or host. The larger device or host may be, for example, a mobile phone, PDA, lap-top or other electrical device. As another possibility, the NFC communicator may be removable from or fixed within a secure element or other data source.

In an embodiment, the present invention provides a data source such as a secure element, for example a SIM card, USIM card, WIM card, SWIM card, SD card, SMC card, UICC or other form of data source, which data source is operable to receive data from an NFC communicator and to determine on the basis of such received data the time frame within which the secure element must respond to the NFC communicator. The data from the NFC communicator may contain data as to the time taken to process incoming NFC data and the time taken to process outgoing NFC data by the NFC communicator. The data may also contain, for example, identification data, instructions (for example a request for data held within the data source), application data.

The data source may form part of a larger device or host and may be removable from or fixed within the larger device or host. The larger device or host may be, for example, a mobile phone, PDA, lap-top or other electrical device.

In an embodiment the present invention provides an NFC communication system which comprises an NFC communicator and a data source which is operable to enable transfer of data from a memory store of the data source directly or indirectly to another near field RF communicator such as an external RFID communicator via the NFC communicator by inductively coupling using the H field and wherein such system:

Is operable to transfer timing data between the NFC communicator and the data source;

Is operable to control the timing of data transfer from the memory store of the data source to the NFC communicator in accordance with the timing data transferred between the NFC communicator and the data source;

Is operable to communicate with another near field RF communicator through modulation of a proximal H field;

Is operable both to initiate communication using the H field and to respond to initiation of communication using the H field by another near field RF communicator;

Is controlled in accordance with instructions received from a controller (for example a microprocessor, microcontroller or reduced instruction set computer) where that controller may be integral to the NFC device or provided within a larger host device or system;

has a modulator to modulate a proximal H field generated by the external RFID communicator;

has a demodulator to demodulate a modulated RF signal received from another near field RF communicator;

and wherein, as a result of communication with another near field RF communicator, data from the data source is transmitted to that other near field RF communicator.

In an embodiment the present invention provides an NFC communicator operable to process data received from another near field RF communicator within a set period of time and to receive data from a data source (for example a secure element) which comprises information on the time for processing and transferring data by the data source.

In an embodiment the present invention provides a data source, for example a secure element, which is operable to calculate the maximum response time from receipt of data by an NFC communicator from another near field RF communicator and to communicate such maximum response time to the NFC communicator.

In an embodiment an NFC communications enabled device is provided comprising a system as described above, or an NFC communicator or data source as described above.

BRIEF DESCRIPTION OF DRAWINGS

Embodiments of the invention will now be described, by way of examples only, with reference to the accompanying drawings, in which:

FIG. 1 is a representational diagram of a mobile phone ("cellphone" or cellular telephone);

FIG. 2 is a representational diagram of a mobile phone;

FIG. 5 is a list of example commands;

FIG. 6 is a list of example commands and responses;

DETAILED DESCRIPTION OF EMBODIMENTS OF THE INVENTION

Figure 3:
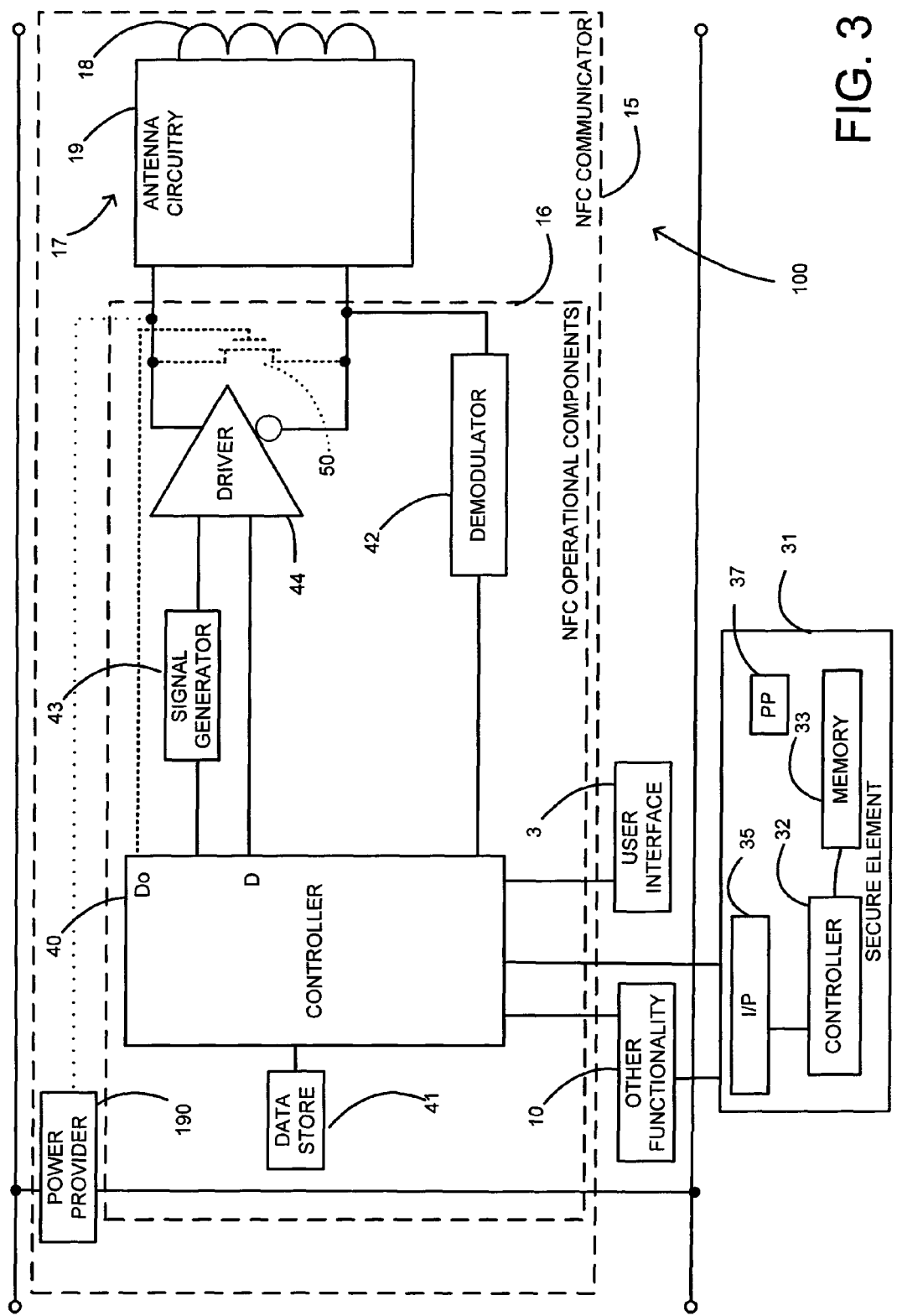
FIG. 3 is a functional block diagram of an NFC communicator.

As used herein, "data source" means any memory or equivalent data storage means which is operable within an NFC communications enabled device or NFC communicator to hold data for transmission via an NFC communicator to an external RFID communicator. The data source may be a secure element but could also be any data source utilising NFC communication to transfer data to a near field RF communicator.

As used herein, "secure element" means any data source which is capable of storing data where at least some of that data comprises secure encrypted information and/or data. Not all of the data held by the secure element need be encrypted.

The secure element may form part of a larger device or system, for example a mobile phone, PDA, lap-top computer or other electrical device. The secure element may be removable from such larger device or system to enable the addition of extra applications or functionality. Examples of the secure element include SD (Secure Digital) cards, miniSD cards, encrypted multi-media cards, SIM (Subscriber Identity Module) cards, other encrypted smart cards, memory cards or similar devices. Such devices may also be referred to as UICCs (Universal Integrated Circuit Card) within standards.

The NFC communicator may be removeable from or fixed to a larger device or host system (referred to as an NFC communications enabled device). Such an NFC communications enabled device may be a mobile phone, lap top, PDA or other similar electronic device. The NFC communicator may also be removeable from or fixed to a secure element or other data source, for example in a credit card size format or key fob format.

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these. Also a device may be provided wholly or partially as an integrated circuit or collection of integrated circuits.

Referring now specifically to FIGS. 1 and 2, there are shown representational diagrams of devices 1 and 1' embodying the invention each comprising a secure element (30 in FIGS. 1 and 31 in FIG. 2) carrying encryption software or an encryption algorithm to ensure secure storage of data relating to a transaction such as, for example, a financial transaction or transactions such as a purchase of a product such as a service and/or or goods and/or information pertaining to or identifying the purchased service or product, for example ticket, permit, pass or access data and, separate from the secure element 30 or 31, an NFC communicator 15 to communicate data stored by the secure element 30 or 31 to another near field RF communicator (which may be an other NFC communicator or could be an RFID reader, for example) by modulating the H (magnetic) field of an RF signal. The devices may also comprise additional functionality (device functionality) 10 and a user interface 3.

In the examples shown in FIGS. 1 and 2, the secure element is coupled to both a controller 20 of the device 1 to enable communication of data between the controller and the secure element 30 or 31 and to the NFC communicator 15 to enable communication of data between the secure element and the NFC communicator 15 and, via the NFC communicator 15, to an external near field RF communicator. Likewise the NFC communicator is coupled to both the controller 20 and the secure element 30. As another possibility, the NFC communicator may only be connected to the controller 20, in which case communication between the secure element 30 and NFC communicator 15 is via the controller 20. In a preferred embodiment there is a direct link between the NFC communicator and the secure element.

In FIGS. 1 and 2, the representations of the NFC communications enabled devices 1 and 1' have been shown partly cut-away and the functionality provided by the NFC communications enabled device 1 or 1' illustrated by way of a functional block diagram within the NFC communications enabled device 1 or 1'.

In the examples shown in FIGS. 1 and 2 the devices 1 and 1' are mobile telephones (cellular telephones or "cellphones"), although the device may be any suitable electronic device for example a portable computing device, for example a PDA or laptop, desktop computer, music system.

In the examples of FIGS. 1 and 2, the NFC communications enabled devices 1 and 1' have the usual features of a mobile telephone including mobile telephone functionality 10 comprising the controller 20 mentioned above (generally a processor or microprocessor with associated memory or data storage), for controlling operation of the mobile telephone, an antenna 8 for enabling connection to a mobile telecommunications network, and a user interface 3 with a display 4, a keypad 5, a microphone 6 for receiving user voice input and a loudspeaker 7 for outputting received audio to the user. The mobile telephone also has a chargeable battery 11 coupled to a charging socket 12 via which a mains adapter (not shown) may be connected to enable charging of the battery 11.

In addition, as mentioned above, the NFC communications enabled devices 1 and 1' each have an NFC communicator 15.

Each NFC communicator 15 comprises NFC operational components 16 for, as will be described below, enabling control of the NFC functionality and generation, modulation and demodulation of an RF signal. Each NFC communicator 15 also comprises a coupler 17 comprising an inductor or coil in the form of an antenna 18 and antenna circuitry 19 to generate an RF signal at, for example 13.56 MHz. The couplers 17 enable inductive coupling of an alternating magnetic field (H field) generated by the antenna of one near field RF communicator by transmission of an RF signal (for example a 13.56 Mega Hertz signal) to the antenna of another near field RF communicator when that antenna is within the near field of the RF signal generated by the one near field RF communicator 15.

In each of FIGS. 1 and 2, the NFC communicator 15 is coupled to the mobile telephone functionality 10 to enable data and/or control commands to be sent between the NFC communicator and the host device and to enable user input to the NFC communicator. Communication between the user interface 3 and the NFC communicator 15 is via the host device functionality 10.

Each NFC communicator 15 also comprises a power provider 190. The power providers 190 may be power supplies within the host device or specific to the NFC communicators 15, for example a button cell battery, or other small battery. As another possibility or additionally as shown by dashed lines in FIGS. 1 and 2, the power providers 190 may simply comprise a coupling to derive power from the corresponding device battery 11.

The secure element 30 or 31 also has a coupling interface 34 comprising one or more coupling elements 35 which may be electrical contact elements but could be wireless or contactless coupling elements, for example capacitive, inductive or electromagnetic coupling elements. The coupling elements may, for example, be in compliance with ISO 7816. The secure element 30 or 31 also has a power provider (PP) 37 which may be a power supply such as a battery or cell within the secure element or may simply be a coupling to a power supply of the device 1 or 1' or the NFC communicator.

The secure element will have some form of controller or processing capability (CONT 32 in FIGS. 1 and 2) with associated memory (MEM 33 in FIGS. 1 and 2). The processing power provided by the secure element 30 or 31 will depend upon the particular secure element and how it interacts with the controller of the device 1 or 1' or the NFC controller. For example, the secure element may carry out only limited processing specific to the applications software, for example encryption and/or decryption of secure data and other processing may be carried out by the controller 20 or the NFC controller.

In the example shown in FIG. 1, the secure element 30 is provided by the SIM (Subscriber Identity Module) or USIM (Universal Subscriber Identity Module) of the mobile telephone while in the example shown in FIG. 2 the secure element 31 is an external memory device receivable in a memory slot of the mobile telephone, for example a SD (Secure Digital) card or miniSD card and is separate from the SIM card 30a.

FIGS. 1 and 2 thus show two different examples of secure elements in accordance with the invention. In the example shown in FIG. 1, the secure element 30 comprises a SIM card which may be provided already in place in the mobile telephone or is inserted prior to activation of the mobile telephone. The SIM card remains in place during mobile telephone operation and is not generally removed by the user. The SIM card has connections (not shown) to other functionality within the mobile telephone and as with the SD card interfaces to the mobile telephone controller 20. In contrast, in the example shown in FIG. 2, the secure element 31 comprises a removable secure element such as an SD card and a user will insert the secure element 31 into the mobile telephone (as and when the user wishes to use the data stored on the secure element or wishes to provide for additional data storage), so that the contact elements of the secure element enable the secure element to interface with the mobile telephone controller 20 and generally also to derive operating power from the mobile telephone power supply 11.

Other examples of possible secure elements are encrypted smart cards, memory cards, encrypted multi-media cards, WIM (WAP Identity Module or Wireless Identity Module) cards, SWIM (Subscriber WAP Identity Module) cards, SMC (Smart Media Card) card or any other form of secure element that is capable of storing data in a secure manner and communicating that secure data with an external near field RF communicator via an NFC communicator.

As another possibility, the secure element may be replaced by some other form of data source. For example the data source may be the controller (and its internal memory) of the mobile telephone functionality 20 or a separate memory within the mobile telephone 1 but associated with the controller. The data source may not necessarily be secure like the secure elements described above or may have some secure areas and some non-secure areas.

FIG. 3 shows a functional block diagram of an NFC communications enabled device 100 (such as the mobile telephone shown in FIG. 2 that is capable of receiving a data source such as a secure element or other data source in addition to its SIM card to illustrate in greater detail one way in which the NFC operational components of an NFC communications enabled device embodying the invention may be implemented.

As described above, an NFC communications enabled device comprises an NFC communicator 15 having NFC operational components 16, an inductive coupler 17 with an antenna 18 and antenna circuitry 19 and a power provider 190. As discussed above, the power provider 190 may be any one or more of: a coupling to a power supply within the host device; a power supply specific to the NFC communicator 15, for example a button cell battery, or other small battery. As another possibility or additionally as indicated by the dotted line in FIG. 3, the power provider 190 may derive a power supply from a signal inductively coupled to the inductive coupler 17. In the interests of simplicity, power supply couplings from the power provider 190 to other components are not shown in FIG. 3.

As shown in FIG. 3, the NFC communications enabled device 100 has other functionality 10 (which may be the mobile telephone functionality described above with reference to FIG. 2) and a user interface 3.

The NFC communicator 15 has a controller 40 to control overall operation of the NFC communicator either alone or in conjunction with the controller 40 of the device 100 and an associated data store 41 to store data (information and/or control data) to be transmitted from and/or received by the NFC communications enabled device. The controller 40 may be, for example, a microprocessor, for example a RISC processor or other microprocessor or a microcontroller or a state machine. Program instructions for programming the controller 40 and/or control data for communication to another near field RF communicator may be stored in an internal memory of the controller and/or the data store 41.

The NFC operational components 15 also have a demodulator 42 coupled between the coupler 17 and the controller 40 to demodulate a modulated RF signal inductively coupled to the coupler 17 from another near field RF communicator in near field range and to supply the thus-extracted data to the controller 40 for processing. In addition the NFC operational components 15 have components to enable modulation of an RF signal to allow data to be communicated to another near field RF communicator in near field range of the NFC communicator 15. As shown in FIG. 3, these components comprise a signal generator 43 coupled to one input of a differential driver 44 having its other input coupled to a data output D of the controller 40 to cause the differential driver 44 to output to the coupler 17 signals modulated by the data supplied from the data output D. As another possibility, as shown in dashed lines in FIG. 3, the NFC communicator controller 40 may, rather than transmit its own modulated RF signal, modulate an incoming RF signal coupled to the coupler 17 by switching off the signal generator 43 and supplying data on an output Do to the control gate of an FET transistor 50, as shown an insulated gate field effect transistor, coupled across an impedance (generally a capacitance (not shown)) of the antenna circuitry 19 so as to switch the transistor on and off in accordance with the data, thereby modulating the load on the antenna circuit in accordance with the transistor on-resistance.

The NFC communicator 15 may operate in an initiator mode (that is as an initiating near field RF communicator) or in a target mode (that is as a responding near field RF communicator), dependent on the mode to which the NFC communicator is set. The mode may be determined by the controller 40 or may be determined in dependence on the nature of a received near field RF signal. When in initiator mode, an NFC communicator generates its own RF signal and initiates communications with any compatible responding near field RF communicator capable of responding to the initiating NFC communicator (for example an NFC communicator in target mode or an RFID tag or transponder) that is in its near field (H field) range, while when in target mode an NFC communicator waits for a communication from a compatible initiating near field RF communicator (for example an NFC communicator in initiator mode or an RFID reader or initiator or transceiver). As thus used, compatible means operable at the same frequency and in accordance with the same protocols, for example in accordance with the protocols set out in various standards such as ISO/IEC 18092, ISO/IEC 21481, ISO/IEC 14443 and ISO/IEC 15693.

The NFC communicator may use any appropriate modulation scheme that is in accordance with the standards and/or protocols under which the NFC communicator operates Whether in initiator or target mode, the NFC communicator may communicate in accordance with an active or passive communications protocol. When using an active communications protocol an initiating NFC communicator will transmit its own RF field and following completion of its data communication turn off its RF field. The responding near field RF communicator (target) will then transmit its own RF field and data before again turning off the RF field and so on. When using a passive communications protocol an initiating NFC communicator will transmit and maintain its RF field throughout the entire communication sequence. In this latter case, the responding NFC communicator may use load modulation. The protocol used will depend on instructions received from the controller and the response received from a responding near field RF communicator.

The secure element 31 shown in FIG. 3 is as described above and generally communicates with the other functionality 10 (the controller of the mobile telephone in FIG. 2) of the device 100 and, as shown in FIG. 3, with the controller 40 of the NFC communicator 15. As mentioned above, the secure element 31 may be replaced by another data source such as a non-secure data source or data may be provided via other functionality 10.

The device 1 shown in FIG. 1 may have the same functionality as shown in FIG. 3 except that the secure element 30 would in the case of the device shown in FIG. 1 be positioned within rather than externally of the other functionality 10.

The NFC communicator 15 may communicate data from any one or more of: its own internal data store (if present); the data store 41; an internal data store of the mobile telephone host controller; another data store within the device 100. The NFC communicator 15 is also operable to enable data communication between the secure element 30 or 31 and another near field RF communicator external to the device via the NFC communicator 15. Depending upon the secure element, data may simply be read from the secure element and communicated by the NFC communicator 15 to another near field RF communicator but may possibly also be supplied by another near field RF communicator to the NFC communicator 15 to be stored by the secure element.

Figure 4:
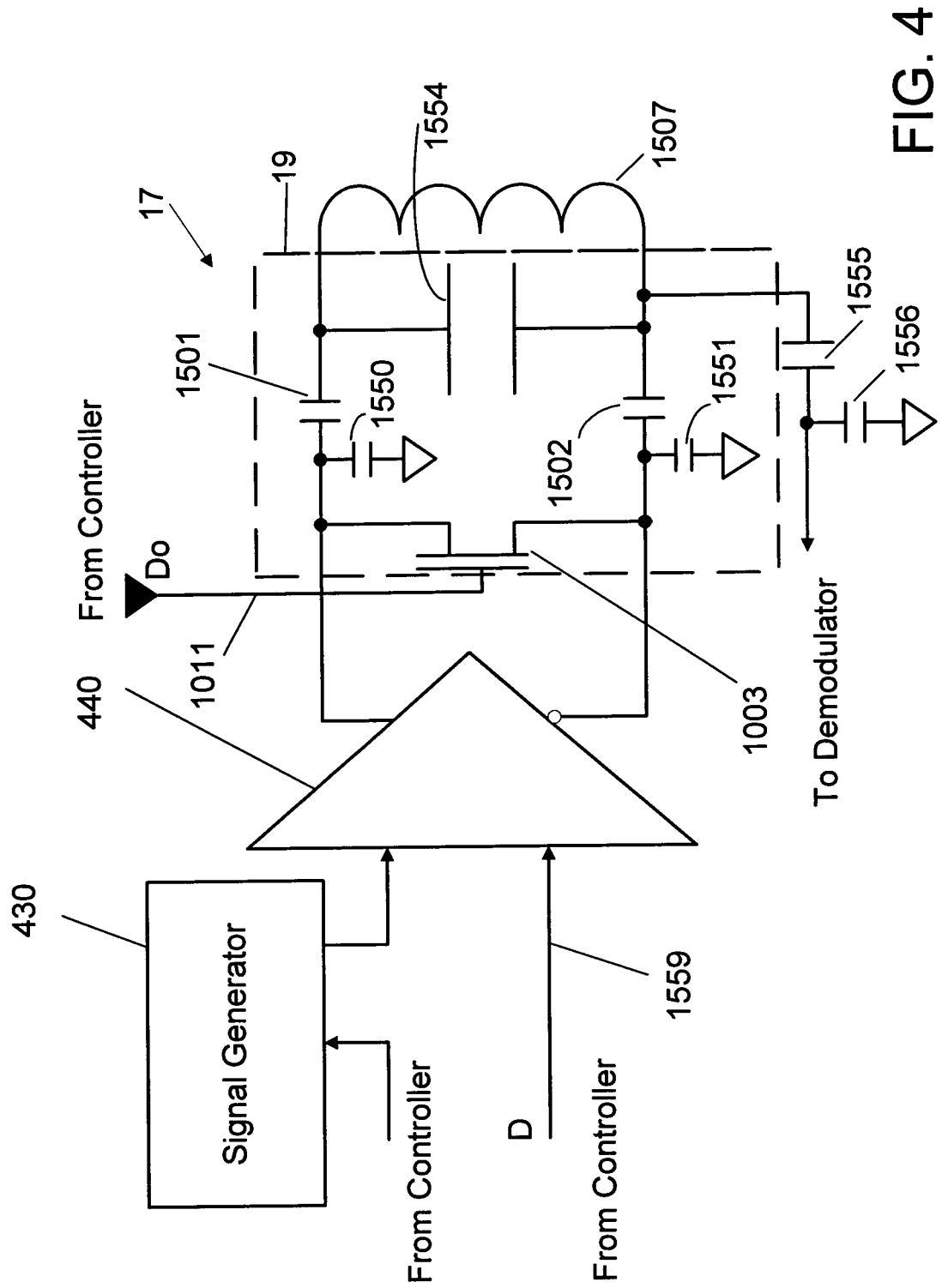
FIG. 4 is a functional block diagram of an NFC communicator.

There are various communication methods which may be used by an NFC communicator, FIG. 4 shows a functional block diagram of part of an NFC communicator capable of operating in a 'carrier generation' communication mode where the NFC communicator initiates (acts as the initiator) NFC communication and of operating in a "load modulation" mode where the NFC communicator responds to (acts as a target for) initiation of NFC communication by another NFC communicator.

In the example shown in FIG. 4, the antenna circuitry 19 consists of a tuned circuit comprising an antenna coil 1507 in parallel with a capacitor 1554. Capacitors 1501 and 1502 are coupled between respective ones of the ends of the antenna coil 1507 and respective ones of the outputs of the differential driver 440 and capacitors 1550 and 1551 couple capacitors 1501 and 1502, respectively, to earth (ground). The output from the antenna circuitry 19 to the demodulator (FIG. 3) is supplied via a capacitor 1555 coupled between a junction between the capacitor 1502 and the corresponding end of the antenna coil 1507 and the demodulator input, a capacitor 1556 being coupled between the capacitor 1555 and earth (ground).

In the 'carrier generation' mode in FIG. 4, a signal generator 430 supplies an oscillating signal to one input of a differential driver 440, the other input of which provides modulation control signals D (FIG. 3) on line 1559 from the controller (40 in FIG. 3) of the NFC communicator to control the amplitude of the complementary pulses that the differential driver 440 provides to the antenna circuitry 19. In this mode, the controller 40 typically uses the modulation control signals D (see FIG. 3) sent to the differential driver 440 to alter the signal level and/or modulation depth of the binary data to be sent (a predetermined pattern of '1's and '0's). The modulation depth may vary from, for example 10% to 100%. The RF signal may be generated by, for example sine synthesis, in which case the signal generator 430 will provide a pulse-width modulated or pulse-density modulated digital signal to the differential driver 440.

In the 'load modulation' mode where the NFC communicator is acting as a target, an externally generated magnetic field induces an AC voltage across the antenna circuitry 19 and a predetermined pattern of binary data representing the data to be communicated is supplied from a controller output (Do in FIG. 3) on line 1011 to the control gate of an IGFET transistor 1003 of known on-resistance to switch the transistor on and off in accordance with the data to be communicated thereby changing the impedance across the antenna circuitry and thus modulating the load on the antenna circuitry of the initiating NFC communicator.

The NFC communicator may additionally comprise a modulation controller which, for example, controls the amplitude of a transmitted RF signal in accordance with the proximity of another near field RF communicator.

The controller of the NFC communicator may provide data parsing, framing, parity and CRC error detection functionality.

FIG. 5 shows an example list of sample commands to which an NFC communicator may respond. As set out above the protocol under which the NFC communicator communicates may depend upon the particular application. Where the NFC communicator is to transmit data representing a transport ticket, RF modulation, data frames and communication protocols in accordance with or compatible with ISO/IEC 14443A may be used. ISO/IEC 14443A lists certain commands that all compatible devices must be capable of responding to, for example the request command REQA and the wake up command WUPA. Apart from these mandatory commands, in the example commands (read ID (RID), read all data (RALL), read a single byte (READ), write-with-erase (WRITE-E) and write-no-erase (WRITE-NE) given in FIG. 6, 8-bit operand frames follow all commands. These 8-bit frames are based upon the 7-bit short frame but have an additional data bit. An example operand frame is shown in FIG. 5.

A CRC (Cyclic Redundancy Check) may also be included in each part of the command and response sequence. If the CRC received by the other near field RF communicator does not match the one generated as data arrives, then the device will halt the operation and move to a 'Command End' status waiting for the next command. This provides additional verification of the communication between two devices. Examples of CRCs which can be used will be clear to the skilled man. For example the CRC may be a 16-bit version as specified under CRC-CCITT—for definition see ISO/IEC 14443-3:2001(E) Annex B: CRC_B.

FIG. 6 shows a sample command-response summary table. The command column shows sample commands that may be sent to an NFC communicator from an initiator near field RF communicator such as, for example, an RFID reader. The table is sub-divided into nine columns to show the operand frames that follow each command frame. The response column shows what response the NFC communicator will give to each of the received commands. Each of these responses is required to be given within a certain time period. For example under the NFC standards, a responding NFC device must supply data in response to a request within 87 micro seconds (plus or minus 6.5 micro seconds). This means that within that timing period the NFC communicator has to receive the command from the near field RF communicator, process that command and respond with the required data. The data required in the response may be held in a data store within the NFC communicator itself, a secure element or other data source separate from the NFC communicator or a data storage within the NFC communications enabled device (but separate from the NFC communicator). For simplicity, these are referred to generally as data stores below. The time taken to acquire data may depend upon the particular data store. The designer of the NFC communicator will not generally know the data store from which the NFC communicator will need to obtain data and will therefore not be able to anticipate the impact that the particular data store being accessed will have on the NFC communicator's ability to respond within the required timing period and if, the NFC communicator is not be able to respond to a command for data within the required time slot, communication between the NFC communicator and the near field RF communicator will be terminated incomplete.

Figure 7:
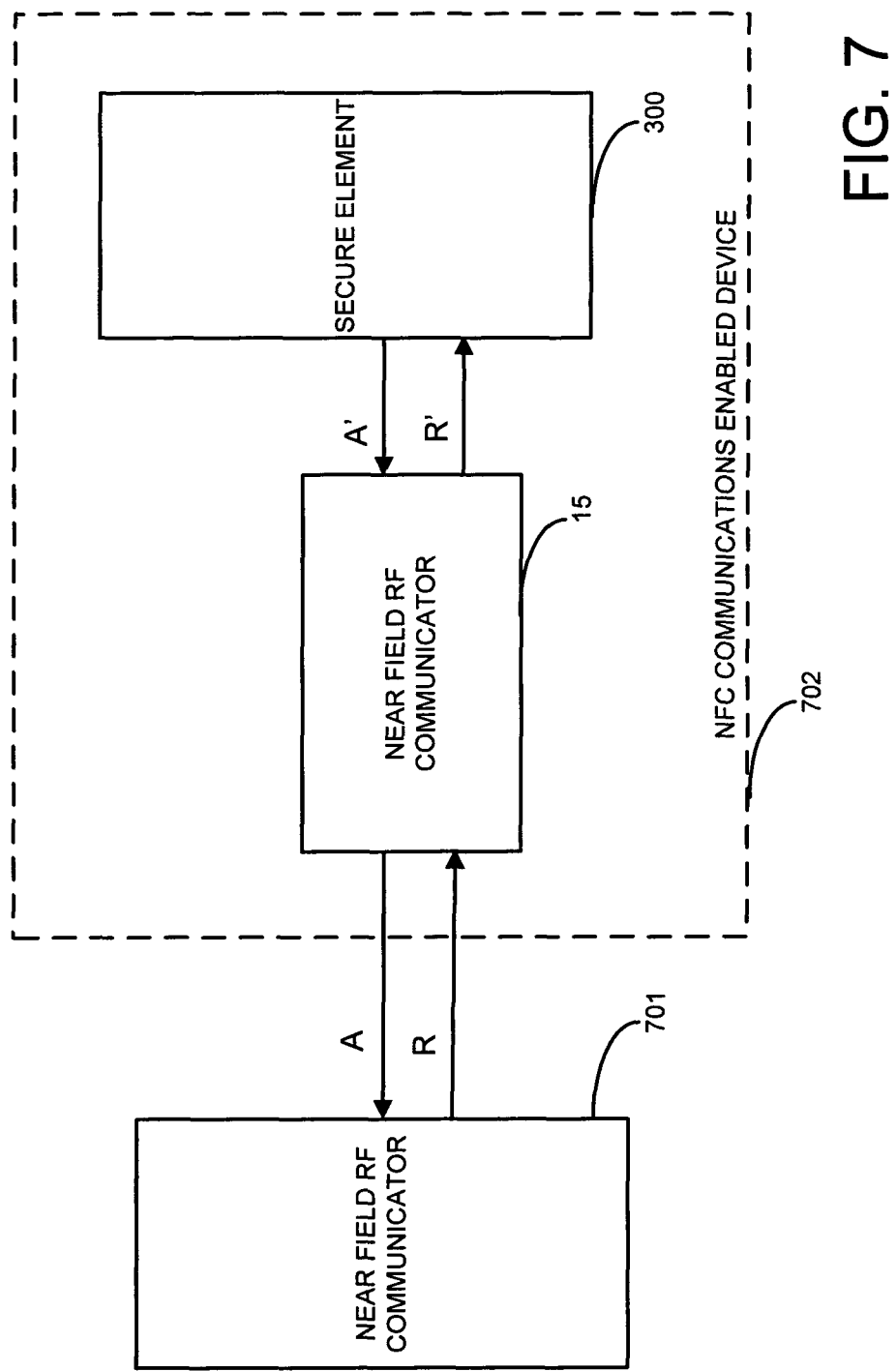
FIG. 7 is a representational diagram of an NFC communications enabled device in accordance with the invention communicating with another near field RF communicator.

FIG. 7 is a representational diagram showing a near field RF communicator 701 communicating with an NFC communications enabled device 702 comprising an NFC communicator 15 and a secure element 300.

The near field RF communicator 701 shown in FIG. 7 may be, for example, an initiator mode NFC communicator or RFID reader of or associated with a point of sale terminal or transport gate.

The near field RF communicator 701 is operable to transmit an H field modulated with the relevant command (for example commands such as those shown in FIG. 5) as represented by R in FIG. 7. Any NFC communications enabled device 702 (for example a mobile phone as described above with reference to FIG. 1 or 2) within near field range and having an NFC communicator 15 that operates in accordance with compatible communication protocols will be capable of receiving and processing the transmitted command. The NFC communicator 15 is configured so as to respond to a request for data from the secure element 300 by communicating a request R' for that data to the secure element 300. The NFC communicator 15 is also configured to provide the secure element 300 with data indicating the time taken by the NFC communicator to receive and process the transmitted request R (referred to as Tin) and the time the NFC communicator 15 expects to take to process the data received from the secure element 300 and transmit an answer A back to the near field RF communicator 701 (referred to as Tout). Generally this data will be transmitted with or at the same time as the request R'. The controller (not shown in FIG. 7 but represented by 32 in FIGS. 1 and 2) of the secure element 300 is configured to combine Tin and Tout to establish a total time: Tin+Tout (referred to as Ttotal). As another possibility, the NFC communicator may be configured to determine Ttotal and communicate Ttotal rather than Tin and Tout to the secure element.

The controller of the secure element is configured to combine Ttotal with its own known response times and to compare the result against the available time for response to establish the time that it has to respond to the NFC communicator with its answer A' to enable the NFC communicator to respond to the near field RF communicator within the timing constraints imposed by the communication protocol being used.

The secure element will have data relating to the total maximum time available under the protocol being used for the NFC communicator to respond to a request from another near field RF communicator. Where the NFC communicator is capable of communicating using multiple communication protocols, the NFC communicator will generally be configured to communicate details of the protocol actually being used to the secure element to enable the controller of the secure element to assess the total time potentially available and therefore the time remaining for it to respond, in dependence upon the particular communications protocol being used. As another possibility, the NFC communicator may communicate details of the total response time available, in addition to Tin, Tout and/or Ttotal.

The secure element controller may be configured to increase Ttotal or the time available for response (or the values of Tin and Tout) by a set figure or threshold value or by multiplier to provide some leeway to ensure that its response A' is provided within plenty of time, that is so that its response A' falls well within the set response time. As another possibility, the NFC communicator, rather than the secure element, may increase the time periods it communicates to the secure element to provide such a safety margin.

In the event the secure element controller determines that it is unable to respond within the required time period, the secure element controller may be configured to respond to the NFC communicator with data indicating that further time is required and the NFC communicator may be configured to communicate this requirement to the near field RF communicator. As another possibility, the NFC communicator may be configured to end communications with the near field RF communicator and only re-start such communications when the data is available from the secure element.

The values of Tin and Tout may vary depending on the NFC communicator and the modulation and demodulation schemes being used. For example a response entailing 10% modulation may have a different Tout to a response entailing 100% modulation of the received H field. Likewise different communication protocols may require different amounts of processing time which may impact on both Tin and Tout.

The values of Tin and Tout may be programmed into or stored in the NFC communicator during manufacture or testing or after manufacture.

Figure 8:
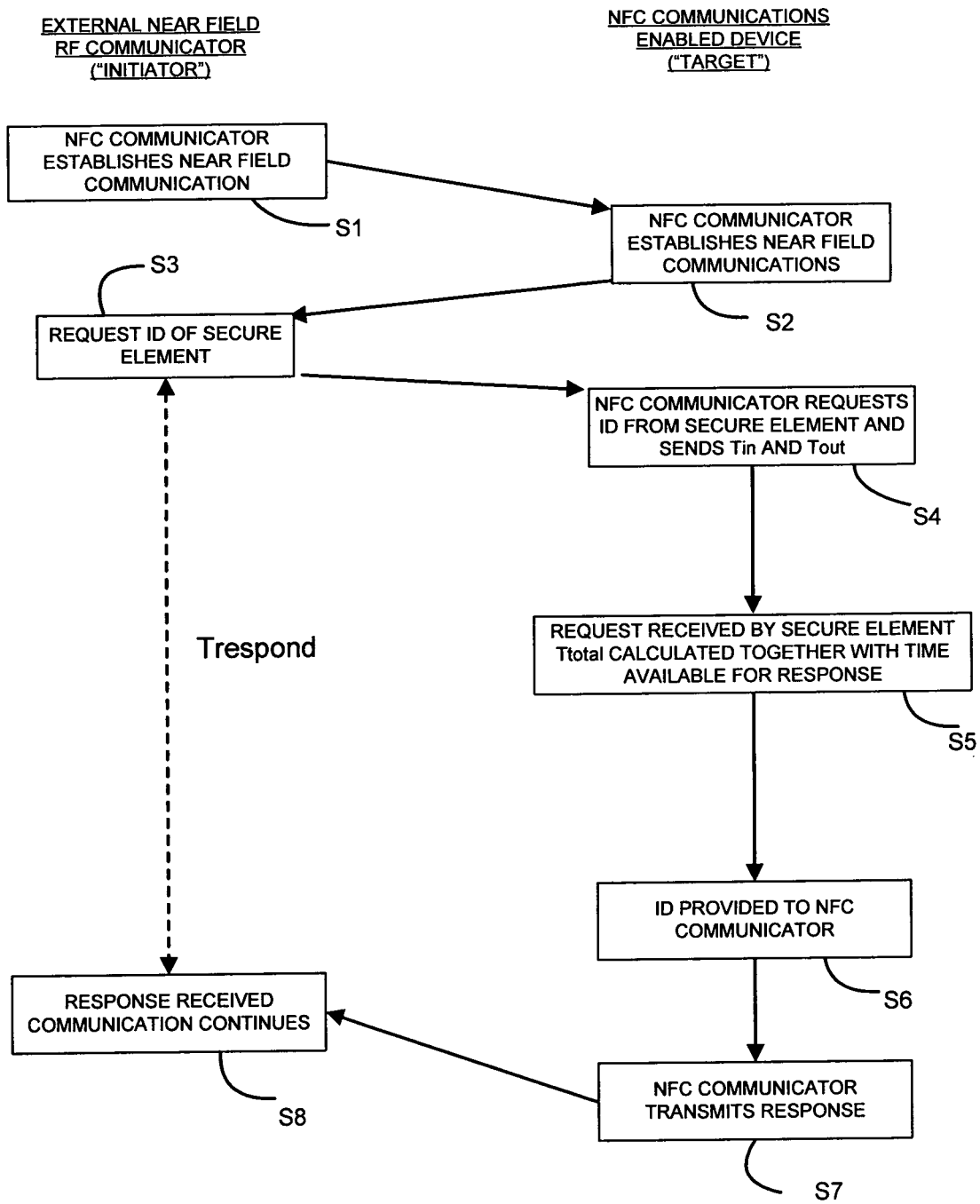
FIG. 8 is a flowchart illustrating communication between the NFC communications enabled device and near field RF communicator shown in FIG. 7.

FIG. 8 shows a flow chart illustrating communication between an initiator near field RF communicator and a target, both of which may be NFC communicators.

As an example, the target mode NFC communicator may be provided within an NFC communications enabled device, such as a mobile telephone, PDA or laptop. Such an NFC communications enabled device also comprises a secure element on which secure data is held, for example payment data or transport data. The external NFC communicator may be stand-alone or comprised within a second NFC communications device, for example a transport ticket gate, payment terminal, cash machine etc.

At s1 In FIG. 8, the external NFC communicator establishes near field communication by transmitting an H field. This H field may be modulated with a Wake-up command. At s2 the NFC communicator within the NFC communications enabled device receives the wake-up command and establishes near field communication by demodulating and processing the received modulated signal. The format of communication established will depend on the communication protocol and whether such protocol is active or passive, as discussed above. The NFC communicator may respond at s2 to the wake-up command with an ATQA response identifying the NFC communicator (not shown in FIG. 8). Where a passive protocol is being used, such response will be through load modulation of the received H field.

Once NFC communication has been established, then at s3 the external NFC communicator requests an ID for the data source, in this case the secure element 300 (FIG. 7). The NFC communications enabled device has to respond to this request for an ID within a set period of time (labelled "Trespond" in FIG. 8). Accordingly, timing constraints now become important. On receipt of the request for an ID, at s4 the NFC communicator retrieves from memory the Tin and Tout data relevant to the communication protocol being used and requests the ID from the secure element 300, at the same time communicating the retrieved Tin and Tout data to the secure element. The Tin and Tout data may be retrieved by the NFC communicator from its own memory of the NFC communicator or potentially from a memory store of the NF communications enabled device. As another possibility, the NFC communicator may transmit Ttotal, i.e. the combination of Tin and Tout.

At s5 the secure element receives the request from the NFC communicator and where not provided the controller of the secure element calculates Ttotal. The controller within the secure element then compares Ttotal against Trespond and set its own response time Tse accordingly so that the combined period Tp=Ttotal+Tse does not exceed Trespond. At s6 the secure element provides the required ID to the NFC controller within the calculated response time Tp. On receipt of the ID at s7 the NFC communicator transmits the response to the external NFC communicator by modulating the received H field. The external NFC communicator receives the transmitted response at s8 and, provided the response has been received within Trespond, the external NFC communicator continues communication if appropriate.

In the example of FIGS. 7 and 8 it is assumed that there is a direct link between the NFC communicator and secure element. Where there is no direct link and communication is via a host system controller or other controller (an "additional controller"), then the additional controller will also need to provide information on delays or effects on processing times. The additional controller may calculate its own response times Trc, add those to the Tin and Tout data received from the NFC communicator and request a response from the secure element within a certain time period on the basis of those calculations. As another possibility, the additional controller may pass the Tin and Tout data (or Ttotal as discussed above) on to the secure element together with its own timing information, so that the secure element can then calculate its required response time as described above.

Although FIGS. 7 and 8 describe a system having a secure element, the data source may be any other form of suitable data source having data storage and processing power to enable it to respond to requests and to effect time period calculations, where necessary.

Figure 9:
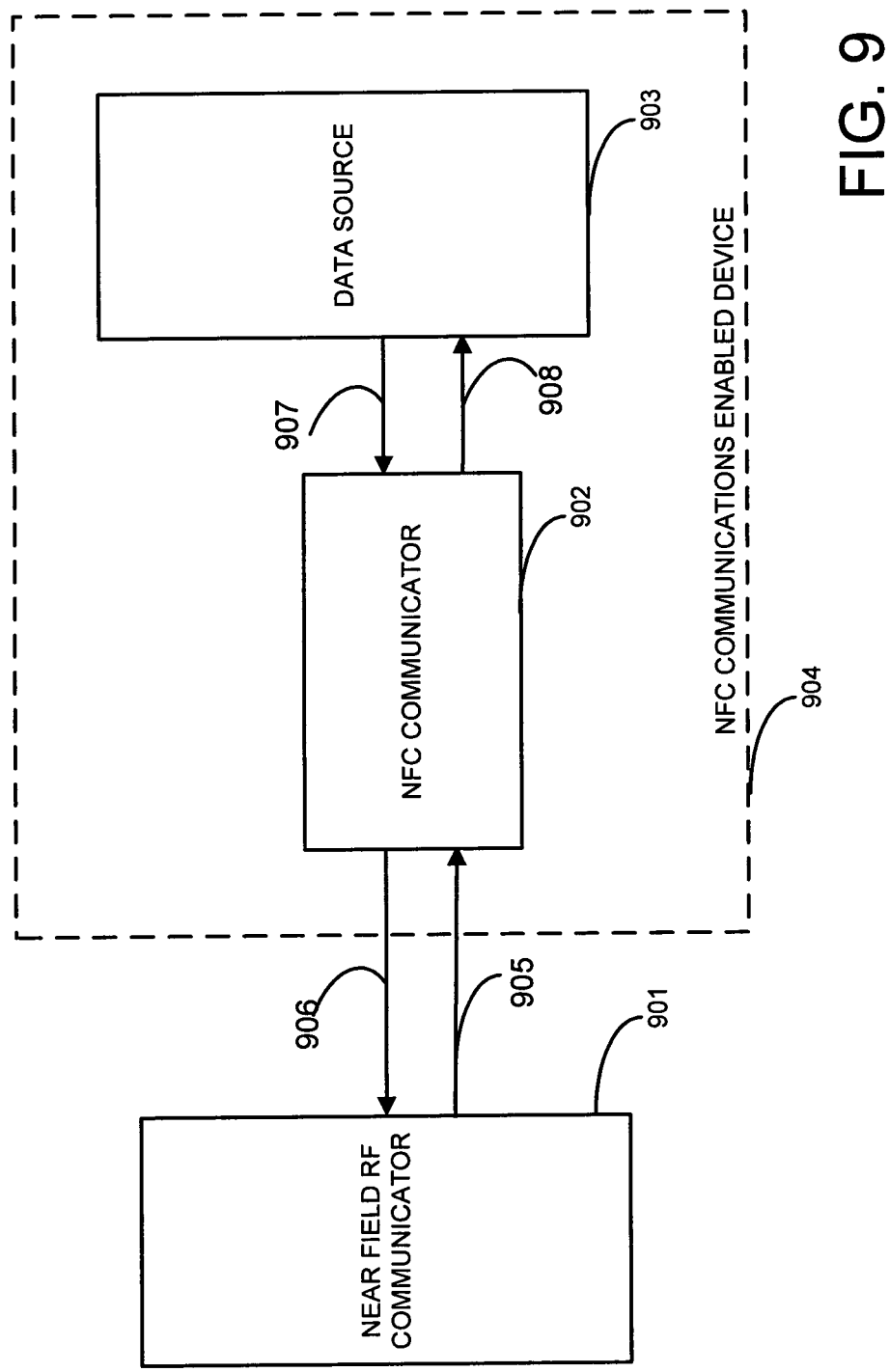
FIG. 9 is a representational diagram of an NFC communications enabled device in accordance with the invention communicating with another near field RF communicator.

FIG. 9 shows a representational diagram illustrating a near field RF communicator 901 communicating with an NFC communications enabled device 904 comprising an NFC communicator 902 and a data source 903

In the examples described with reference to FIGS. 7 and 8, the NFC communicator provides information on response times and the data source (for example the secure element as shown in FIGS. 7 and 8) calculates the total response time available and responds accordingly. As will be described below with reference to the flowchart shown FIG. 10, as another possibility control of response may be within the remit of the NFC communicator. For example the NFC communicator may be designed to ensure that its maximum response time, i.e. the time taken to receive and process data from an external near field RF communicator and the time taken to process and transmit data back to the external near field RF communicator "Ttotal[1]" does not exceed a set threshold, where communication is with a standards compatible or set range of external near field RF communicators. For example this threshold may be set at 500 microseconds.

This maximum response time Ttotal[1] can then be used by the corresponding secure element to calculate a total delay time "Tdelay" which will include the timing delay introduced by the data source for processing data from the NFC communicator, internal processing and then processing and responding to the NFC communicator. Tdelay may or may not include Ttotal[1]. The secure element may then communicate Tdelay to the NFC communicator. Tdelay may be communicated in advance of other data, together with other data or together with the data for transmission to the external near field RF communicator (the payload). Tdelay (whether or not it comprises Ttotal[1]) can then be used by the NFC communicator to control communication of the data from the data source to the external near field RF communicator.

The near field RF communicator 901 shown in FIG. 9 is configured to transmit an H field modulated with the relevant command (for example as shown in FIG. 5) 905 for receipt and processing (via demodulation) by any NFC communications enabled device 904 having an NFC communicator 902 operable in accordance with the same communication protocols within near field range of the transmission. The NFC communicator 902 is designed so that its maximum processing time (including time required for return transmission of data—Ttotal[1]) is less than a predetermined time, for example 500 microseconds. In this example, the data source 903 is provided with Ttotal[1] and is configured to calculate the total response delay time, i.e. Tdelay, in response to a request for data (represented by line 908 in FIG. 9) from the NFC communicator 902 and to communicate Tdelay to the NFC communicator 902 (represented by line 907). In this example Tdelay includes Ttotal[1] and is therefore the maximum communication delay applicable to communication between the NFC communicator 902 and the near field RF communicator 901. The NFC communicator 902 is configured to use Tdelay to control communication (shown by line 906) with the external near field RF communicator 901. Thus, the NFC communicator 902 is configured where response is possible within the timescales set by the relevant communication protocol to ensure that the requested data is provided in accordance with the appropriate protocols and where the value of Tdelay means that a response is not possible within the timescales set by the relevant communication protocol to respond to the near field RF communicator accordingly, for example to respond with an instruction to wait for the data or to provide some other form of holding response.

The NFC communicator 902 in FIG. 9 may be the same or different from the NFC communicator 15 described with respect to FIG. 7. The NFC communicator 902 and data source 903 are shown within an NFC communications enabled device 904 such as a mobile phone, PDA or other electrical device. As other possibilities, the data source 903 may be separate from the NFC communications enabled device or one or more of the NFC communicator 902 and data source 903 may not form part of a larger device or system.

FIG. 9, like FIG. 7, assumes that communication between the NFC communicator and data source is direct. Where there is no direct link and communication is via a host system controller or other controller (an "additional controller"), then information on delays or effects on processing times resulting from the indirect communication will be required. Thus, in such a case, one of Ttotal[x] and Tdelay will then need to incorporate any delay in response caused by such indirect communication.

Tdelay information from the data source 903 may be embedded for example in the first 2 bytes of the response 907 provided to the NFC communicator 902. In order to do this, the initial byte ("Byte 1") of the response is set to a value that indicates to the NFC communicator that the response contains Tdelay. For example the response may be in the form or 3 bytes:

"010x1111/xxxxxxxx/xxxxxxxx"

| Byte 1 | Byte 2 | Byte 3 | where the "1111" in the first byte indicates to the NFC communicator that the next two bytes contain Tdelay information. Upon receipt of such data, the NFC communicator will convert the data in bytes 2 and 3 to an integer number of bit periods corresponding to radio frequency response times.

Whether the NFC communicator controls response times or the data source controls response times, such response times also need to take into account any delay relevant to the mechanism of communication between the NFC communicator (15 in FIGS. 7 and 902 in FIG. 9) and the data source (300 in FIGS. 7 and 903 in FIG. 9), where such communication is direct (and any intervening communication delay where the communication is indirect).

Where communication is direct, it may, for example, be via a single wire protocol (referred to as "SWP") as described in the relevant ETSI and ISO standards or via an S2C protocol. The delay in response times introduced by the communication mechanism may form part of either the delay time for the NFC communicator or the delay time for the data source or both. For example, Tdelay may comprise the communication mechanism delay times or such delay times may be taken into account in the design of the NFC communicator and therefore form part of Ttotal[1].

Figure 10:
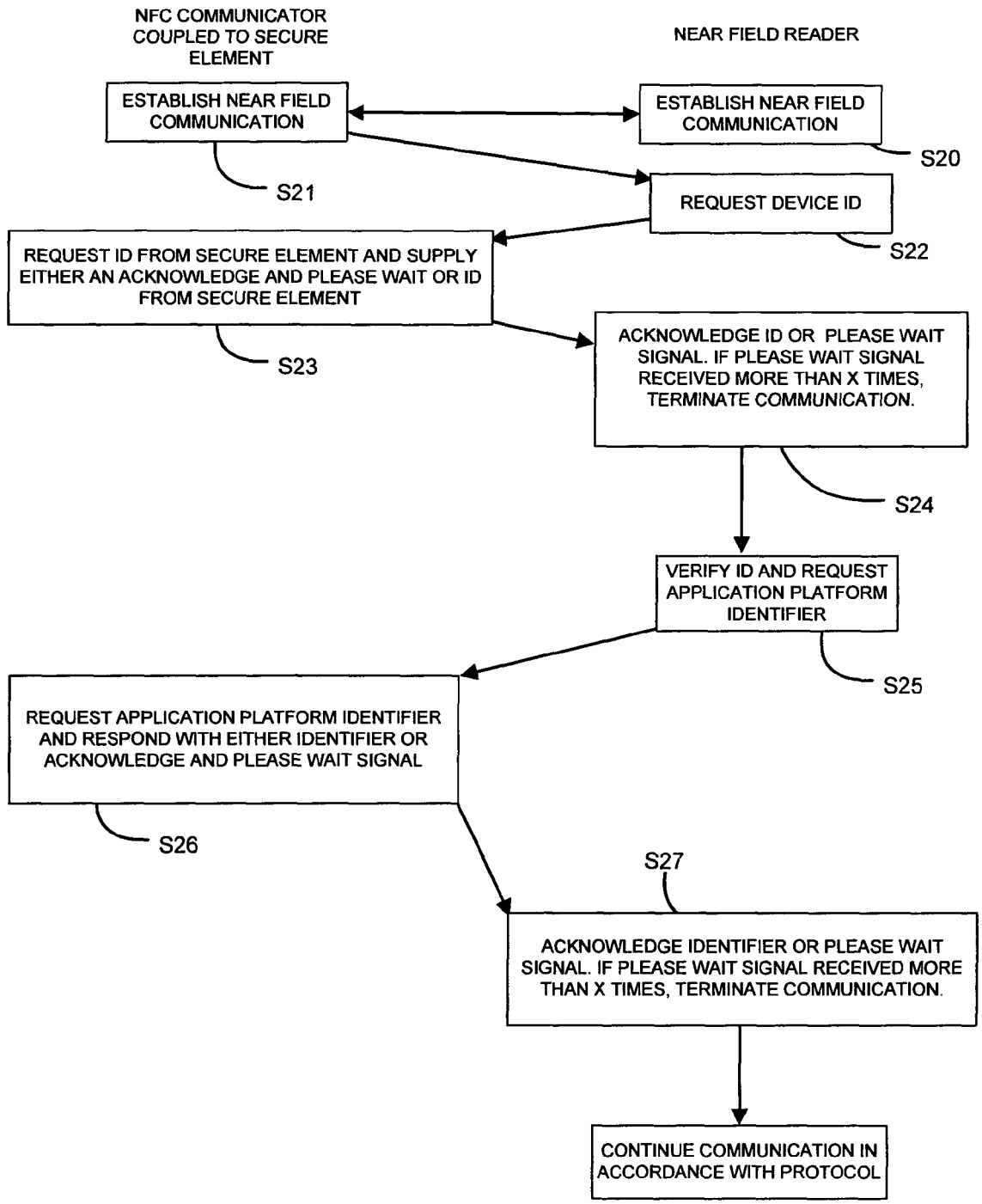
FIG. 10 is a flowchart illustrating communication between the NFC communications enabled device and near field RF communicator shown in FIG. 9.

FIG. 10 shows a flow chart illustrating an example of communication between two near field RF communicators such as those shown in FIG. 9. In FIG. 10 communication is illustrated as being between an NFC communicator and a near field RF reader (although it may be an initiator mode NFC communicator) which is seeking data held on a secure element directly linked to the NFC communicator, via for example via an SWP interface.

At S20 and S21 in FIG. 10, near field communication is established between the two near field communicators. On receipt of a wake-up response from the NFC communicator, at S22 the near field RF reader modulates its transmitted RF field with data representing a device ID request command to request identification of the NFC communicator. In this example, the ID data is held on the secure element linked to the NFC communicator. The NFC communicator is designed to process near field RF communications and respond to near field RF communications within a maximum set time period (Ttotal[1]) which in this case includes the total time from receipt of the last bit of the request for identification from the near field RF reader to transmission of a response back to the near field RF reader by the NFC communicator and includes the transmission time for transmission of data over the SWP interface.

Upon receipt of the device ID request at S23, the NFC communicator requests the data from the secure element.

The secure element linked to the NFC communicator via the SWP interface responds to this request with timing information together with the ID data. The timing information represents Tdelay and includes the delay associated with processing and response by the secure element.

The NFC communicator times the delay in receiving a response from the secure element. At S23, if a response is not received from the data source in time to respond to the reader within the required response period, then the NFC communicator responds to the reader with an acknowledgement and please wait signal, otherwise the NFC communicator sends the data. If at S24 the reader receives a please wait signal the reader checks to see if this has been received a predetermined number of times, for example three, and if so terminates the communication at S24. If the requested data is received before the please wait signal has been received a predetermined number of times, then the reader verifies it at S25 and in this example requests supply of an applications platform identifier for each platform accessible to the NFC communicator, although other communication may occur, depending upon the particular NFC communicator and reader and the use to which they are being put.

On receipt of the request for an applications platform identifier for each platform accessible to the NFC communicator at S26, the NFC communicator requests the required data from the secure element. This time the NFC communicator will already know the Tdelay timing information and will therefore be able to control communication with the near field RF reader accordingly. Thus, at S26, if necessary based on the value of Tdelay, the NFC communicator responds to the reader with an acknowledgement and please wait signal, otherwise the NFC communicator sends the data. If the reader receives a please wait signal, the reader checks at S27 to see if this has been received a predetermined number of times, for example three, and if so terminates the communication at S27. If the data is received before the please wait signal has been received a predetermined number of times then the reader verifies it at S27 and communication continues in accordance with the relevant communication protocol.

As another possibility, rather than requesting data each time from the secure element, following initial communication between the NFC communicator and secure element, the NFC communicator may request and download all relevant data from the secure element, provided this can be achieved within the time period allowed, that is before the please wait signal has been sent the predetermined number of times. In such an example the NFC communicator may only need to respond with an acknowledgment and please wait signal for the first data response.

As another possibility the timing responses described above may be combined. For example the NFC communicator may be designed to respond within a maximum period of time (as described with respect to FIG. 9), Ttotal$^1$ and the secure element may use that data to control the time within which it responds to the NFC communicator.

Again, although FIGS. 9 and 10 describe use of a secure element, the data source may be any other form of suitable data source having data storage and processing power to enable it to respond to requests and to effect time period calculations, where necessary.

An embodiment provides a mobile telephone or PDA or laptop comprising a secure element or other data source and NFC communicator. As another possibility a mobile telephone or PDA or laptop may be operable to interface with a data source and NFC communicator. One or both of the data source element and NFC communicator may be removable from the mobile telephone or PDA or laptop. The data source may be any suitable data source, for example a secure element as described above. The NFC communicator may be any NFC communicator. The NFC communicator or parts of the NFC communicator may or may not be integral with components of the mobile telephone or PDA or laptop.

In examples described above, an NFC communicator is incorporated within a larger device. In such a case, the NFC communicator may be a discrete entity within the host device or may be provided by features dispersed throughout or integrated within the host device or a part of the host device. Where an NFC communicator is within a larger device or system, all of the functionality may be comprised within the central processing board of the larger device or system or alternatively split between different processing boards. In addition the functionality of an NFC communicator may be provided by software and/or firmware and/or hardware, as appropriate.

It will be appreciated that the above gives mobile telephones and PDAs and laptops as examples of host devices. A host device may be another type of electrical device such as an audio and/or video player, MP3 player, an IPOD®, CD player, DVD player or other electrical device.

An NFC communicator may be combined with a removable data source such as a secure element, for example an NFC-enabled SD card or flash memory card, so that the combination is insertable and/or removable from a host device. The data source may then provide a data store for the NFC communicator. The data source may share processor power with the NFC communicator or alternatively the NFC communicator may be controlled by the data source processor or controller. The combined NFC communicator/data source may be used as a stand-alone device or alternatively may be inserted into another electrical device or host device, for example a mobile telephone or PDA.

In an embodiment, the controller of the data source may control at least some of the functionality of the NFC communicator 15 or possibly even a host device, for example the data source may control aspects of the host device that relate to display of its data.

As another possibility, the NFC communicator may be replaced by another form of near field RF communicator, for example a near field RF communicator capable of responding to initiation of NF communication but not of initiating NF communication, such as an RFID tag or transponder. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention.

The invention claimed is:

1. A communication device, comprising:
  a demodulator configured to extract a request for data from a first modulated signal;
  a controller configured:
    to provide timing data to a data source, the timing data being related to a first time taken by the communication device to receive the request, a second time taken by the communication device to process the request, and a third time taken by the communication device to process and to transfer the data received from the data source, and
    to receive a response from the data source indicating whether a combination of the first time, the second time, the third time and a time required for the data source to respond to the request is sufficient to complete the request; and
  a modulator configured to modulate the data received from the data source to provide a second modulated signal.

2. The communication device of claim 1, wherein the data source comprises:
  a secure element.

3. The communication device of claim 1, wherein the communication device is further configured to respond to the request within timing constraints imposed by a communication protocol.

4. The communication device of claim 1, wherein the controller is further configured to provide a second request for additional time to complete the request when the response from the data source indicates that the combination is insufficient to complete the request.

5. The communication device of claim 4, wherein the combination is insufficient when the combination is greater than the total time available from timing constraints imposed by a communication protocol.

6. The communication device of claim 1, wherein the response is data from the data source when the combination is sufficient and the response is a second request for additional time when the combination is insufficient.

7. A data source, comprising:
  a data store configured:
    to receive timing data from a communication device, the timing data being related to a first time taken by the communication device to receive a request for data from the communication device, a second time taken by the communication device to process the request, and a third time taken by the communication device to process and to transfer the data received from the data source, and
    to provide a response to the communication device indicating whether a combination of the first time, the second time, the third time and a time required for the data source to respond to the request is sufficient to complete the request.

8. The data source of claim 7, wherein the data source comprises:
  a secure element.

9. The data source of claim 7, wherein the data source is further configured to respond to the request within timing constraints imposed by a communication protocol.

10. A near field communications (NFC) enabled device, the NFC enabled device comprising:
  a demodulator configured to extract a request for data from a first modulated signal;
  a controller configured:
    to provide timing data to a data source, the timing data being related to a first time taken by the NFC enabled device to receive the request, a second time taken by the NFC enabled device to process the request, and a third time taken by the NFC enabled device to process and to transfer the data received from the data source, and
    to receive a response from the data source indicating whether a combination of the first time, the second time the third time and a time required for the data source to respond to the request is sufficient to complete the request; and
  a modulator configured to modulate the data from the data source to provide a second modulated signal.

11. The NFC enabled device of claim 10, wherein the data source comprises:
  a secure element.

12. The NFC enabled device of claim 10, wherein the data source is configured to be at least one selected from a group consisting of:
  insertable into the NFC enabled device;
  removable from the NFC enabled device;
  connectable to the NFC enabled device; and
  coupleable to the NFC enabled device.

13. The NFC enabled device of claim 10, wherein the NFC enabled device is a mobile telecommunications device that is configured to communicate via a mobile telecommunications network, the mobile telecommunications device being configured to store the data in the data source.

14. The NFC enabled device of claim 10, wherein the NFC enabled device is further configured to respond to the request within timing constraints imposed by a communication protocol.

15. The NFC enabled device of claim 10, wherein the controller is further configured to provide a second request for additional time to complete the request when the response from the data source indicates that the combination is insufficient to complete the request.

16. The NFC enabled device of claim 10, wherein the combination is insufficient when the combination is greater than the total time available from timing constraints imposed by a communication protocol.

17. The NFC enabled device of claim 10, wherein the response is data from the data source when the combination is sufficient and the response is a second request for additional time when the combination is insufficient.

* * * * *